(12) United States Patent
Tóth et al.

(10) Patent No.: US 7,077,459 B2
(45) Date of Patent: Jul. 18, 2006

(54) VEHICLE FRAME MAINLY FOR BUSES

(75) Inventors: János Tóth, Budapest (HU); Balázs Bekö, Isaszeg (HU)

(73) Assignee: Nabi Autobuszipari Rt., Budapest (HU)

( * ) Notice: Subject to any disclaimer, the term of this patent is extended or adjusted under 35 U.S.C. 154(b) by 0 days.

(21) Appl. No.: 11/172,913

(22) Filed: Jul. 5, 2005

(65) Prior Publication Data

US 2005/0269834 A1 Dec. 8, 2005

(51) Int. Cl.
*B62D 31/00* (2006.01)
(52) U.S. Cl. .............. 296/178; 296/190.1; 296/190.08; 296/201; 296/205
(58) Field of Classification Search ................ 296/178, 296/179, 190.1, 190.08, 201, 205, 203.02, 296/96.21
See application file for complete search history.

(56) References Cited

U.S. PATENT DOCUMENTS

| 2,389,907 | A | | 11/1945 | Helmuth |
| 5,213,386 | A | | 5/1993 | Janotik et al. |
| 6,183,034 | B1 | * | 2/2001 | Moody et al. ........... 296/96.21 |
| 6,685,254 | B1 | * | 2/2004 | Emmons et al. ............ 296/178 |
| 6,948,768 | B1 | * | 9/2005 | Corcoran et al. ...... 296/190.08 |

* cited by examiner

*Primary Examiner*—Jason Morrow
(74) *Attorney, Agent, or Firm*—Norman N. Kuhitz, Esq.; Fitch, Even, Tabin & Flannery

(57) ABSTRACT

A vehicle frame includes a load carrying framework and a body mounted on the framework. The framework has a board frame, a window frame for windscreen, a pair of upper balks and a pair of upper window balks along both sides of the vehicle and supported at least by door pillars. The window frame has a one piece U shaped member arranged between the board frame and the pair of upper balks, and an upper cross member connected to prongs of the U-shape member, the under part of the U-shape member being fastened to the board frame and an intermediate part of both prongs of the U-shape member being fastened to a waist plate fixed on the board frame.

4 Claims, 4 Drawing Sheets

VEHICLE FRAME MAINLY FOR BUSES

BACKGROUND OF THE INVENTION

The field of the invention is a vehicle frame mainly for busses comprising a load carrying framework and a body mounted on the framework, with said framework comprising, besides other means, a window frame for a windscreen.

DESCRIPTION OF RELATED ART

A space frame for an automotive vehicle includes nesting means for a windscreen. Buses and coaches have a huge, one-piece screen-glass, which takes about one half of the whole area of the front wall of the bus. Rubber sealing means or other adhesive fastens the screen-glass in a window-frame, which is a part of the space frame. The two side members of the window-frame have a significant role in safety of the passengers in case of an accident or overturn of the bus. The two side members of the window-frame have to satisfy two conflicting requirements of high strength and of low blocking the field of sight. A side member of high strength has typically a hollow profile of high rigidity, which profile is too wide for low blocking of the field of sight.

The hollow profile of the side members typically comprises of two opened profiles of shaped plates united by their long edges by welding. Typically the hollow profile of the side members are widened at both ends of the members.

U.S. Pat. No. 2,389,907 refers to a vehicle structure comprising a substantially rectangular frame, wherein the forward ends of a pair of longitudinal members arranged on both sides of the frame are curved downwardly and forwardly of the frame to form a windshield and cowl framing with the lower ends rigidly secured to the frame.

U.S. Pat. No. 5,213,386 refers to a space frame of a vehicle which includes a base member, a pair of side members mounted on the base member, a top member and a cross member interconnected to the base member, the side members and the top member. Each of the above members has an endless closed shape. No teaching of a window-frame is incorporated in the description.

A space frame of busses produced in small series is typically made of tubes. The pieces of tube are welded together in a lattice structure. An outer wall mounted on the lattice structure is made of fiber enforced synthetic resin. The window frame comprises side members and horizontal members. The under and upper ends of the side members of the window-frame are welded to the ends of the under and upper horizontal members.

The window-frame in the above constructions takes part only partially in securing the safety of the passengers in case of an accident or overturn of the bus.

SUMMARY OF THE INVENTION

The aim of the invention is to create a window frame contributing to the safety of passengers more than the known solutions by directing deforming forces from the side members of the window frame to the more durable parts of the space frame.

Accordingly the present invention is a vehicle frame mainly for busses comprising:
- a load carrying framework and a body mounted on the framework, with
- said framework comprising a board frame, a window frame for windscreen, a pair of upper balks and a pair of upper window balks along both sides of the vehicle and supported at least by door pillars, and
- wherein said window frame comprises a one piece U shaped member arranged between the board frame and the pair of upper balks, and an upper cross member connected to prongs of the U-shape member, with
- the under part of said U-shape member being fastened to the board frame and an intermediate part of both prongs of the U-shape member being fastened to a waist plate fixed on the board frame.

Favorably the U-shape member is assembled by welding together pieces of metal pipe, the upper ends of the U-shape member are curved to be in line with the upper balks, and said ends of the U-shape member are welded to the upper balks.

A doorframe of a passenger door is arranged in the vicinity of and in line with a section of a prong of the U-shape member the upper part of said doorframe being in line with an upper window balk of the framework of a sidewall.

A doorframe of a driver's door is arranged in the vicinity of a section of a prong of the U-shape member, with the upper part of said doorframe being in line with an upper window balk of the framework of a sidewall, and there is a window opening between said doorframe and the U-shape member bordered by an under frame member.

The advantage of the present invention is that the window frame contributes to the safety of the passengers not only by the strength of its side members, but by directing deforming forces from the side members to more durable parts of the space frame. Another advance of the present invention is that it makes possible to construct very large and esthetically favorable windshields without any limitation.

DESCRIPTION OF THE PREFERRED EMBODIMENT

Figure 1:
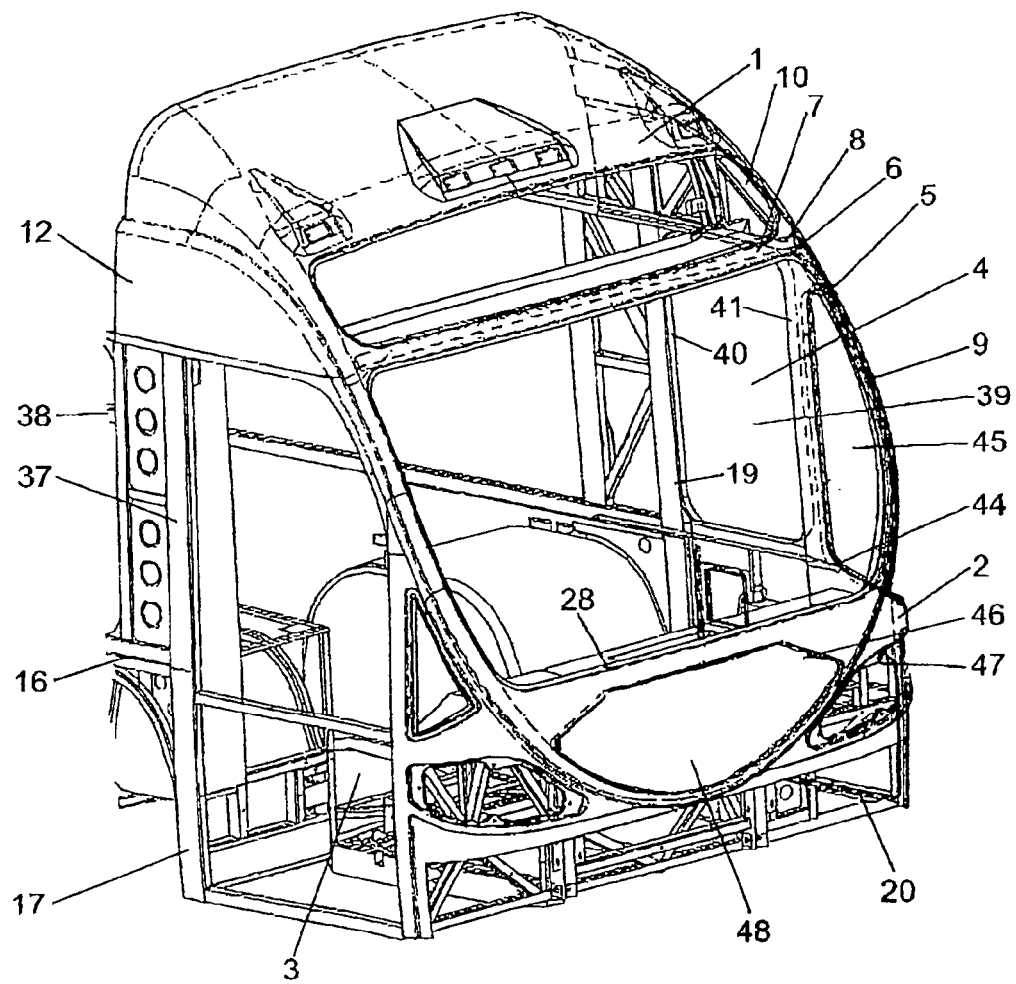
FIG. 1 is a perspective view of a front part of a space frame according to the invention.
Figure 2:
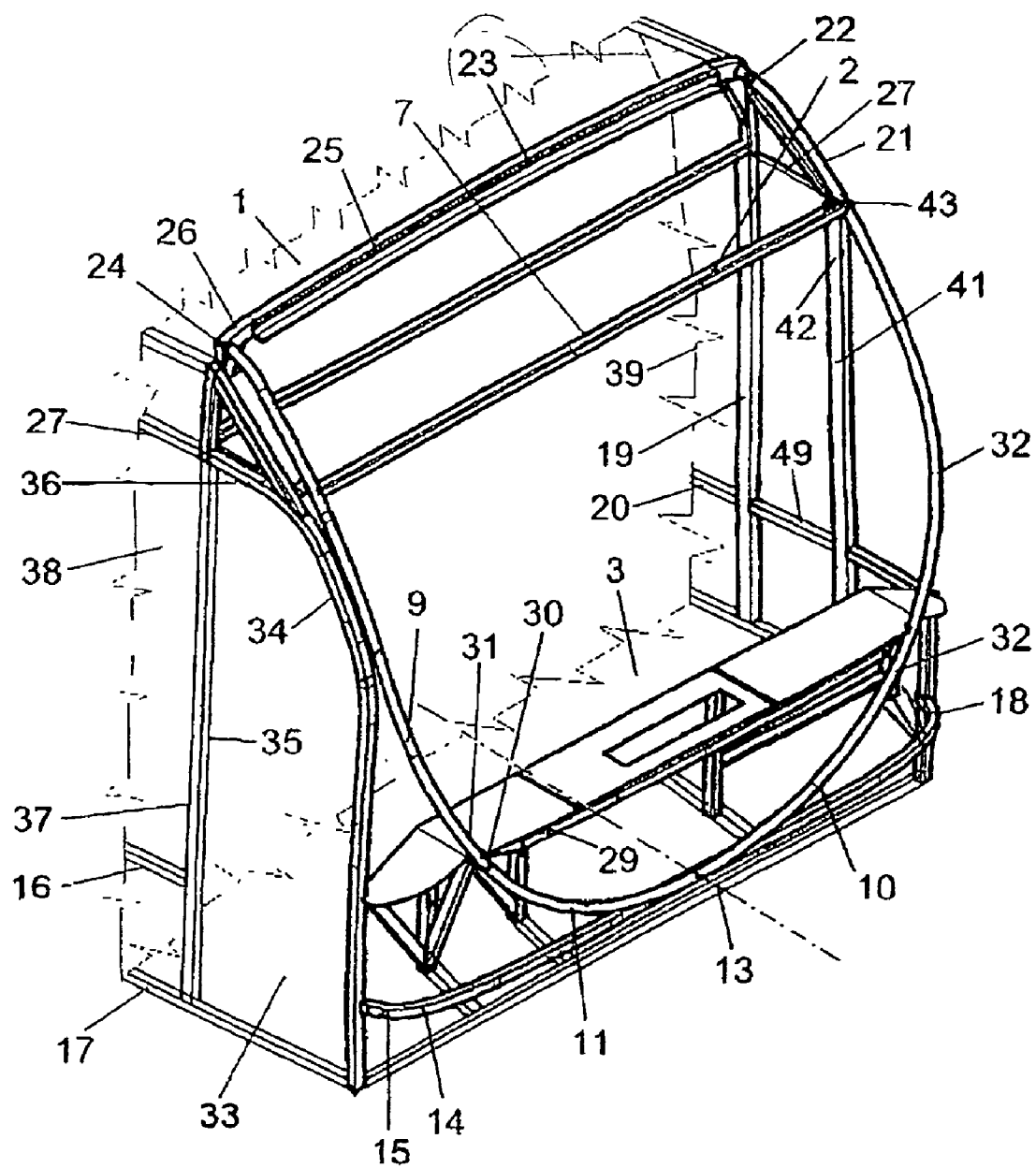
FIG. 2 is a perspective view of the framework of the front part according to FIG. 1
Figure 3:
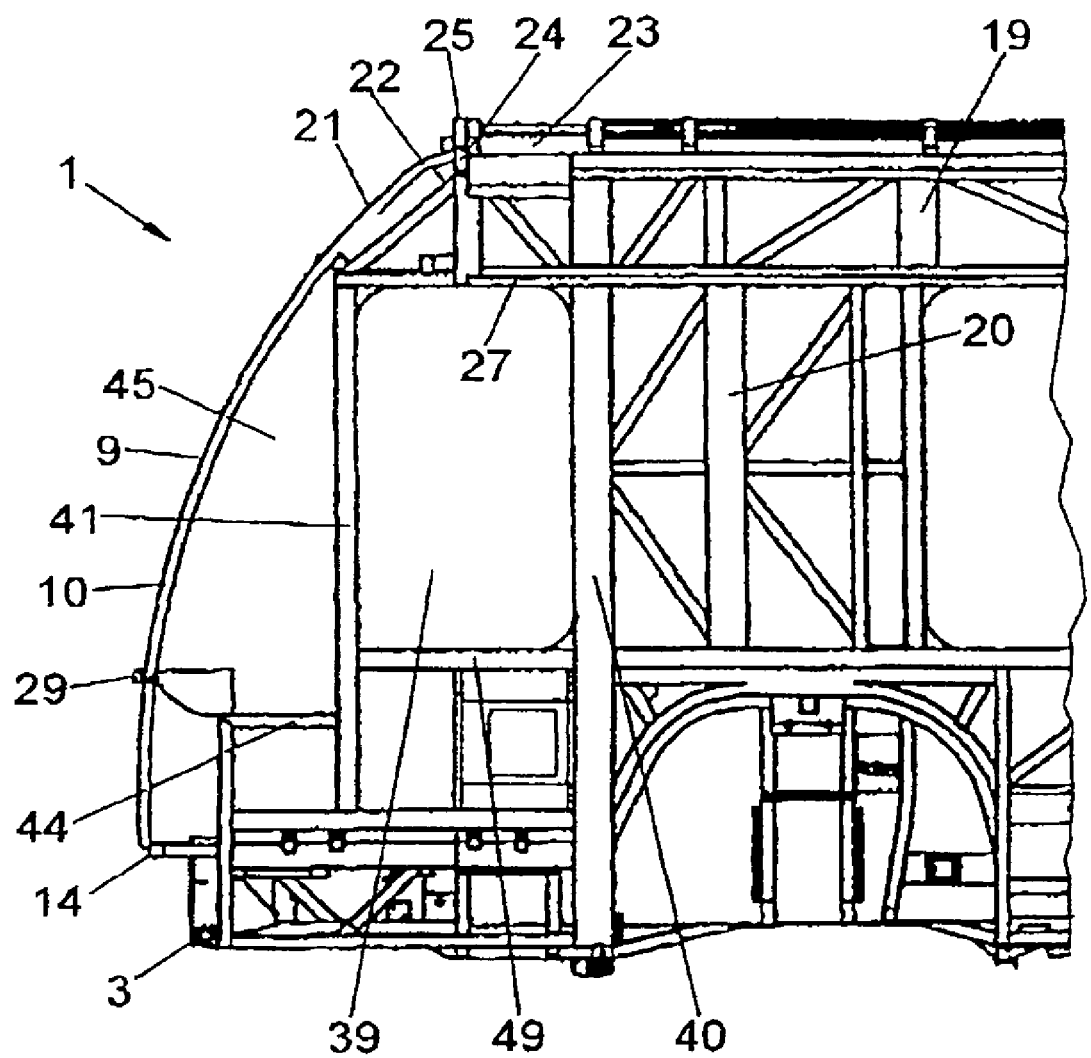
FIG. 3 is a left side view of the framework according to FIG. 2.
Figure 4:
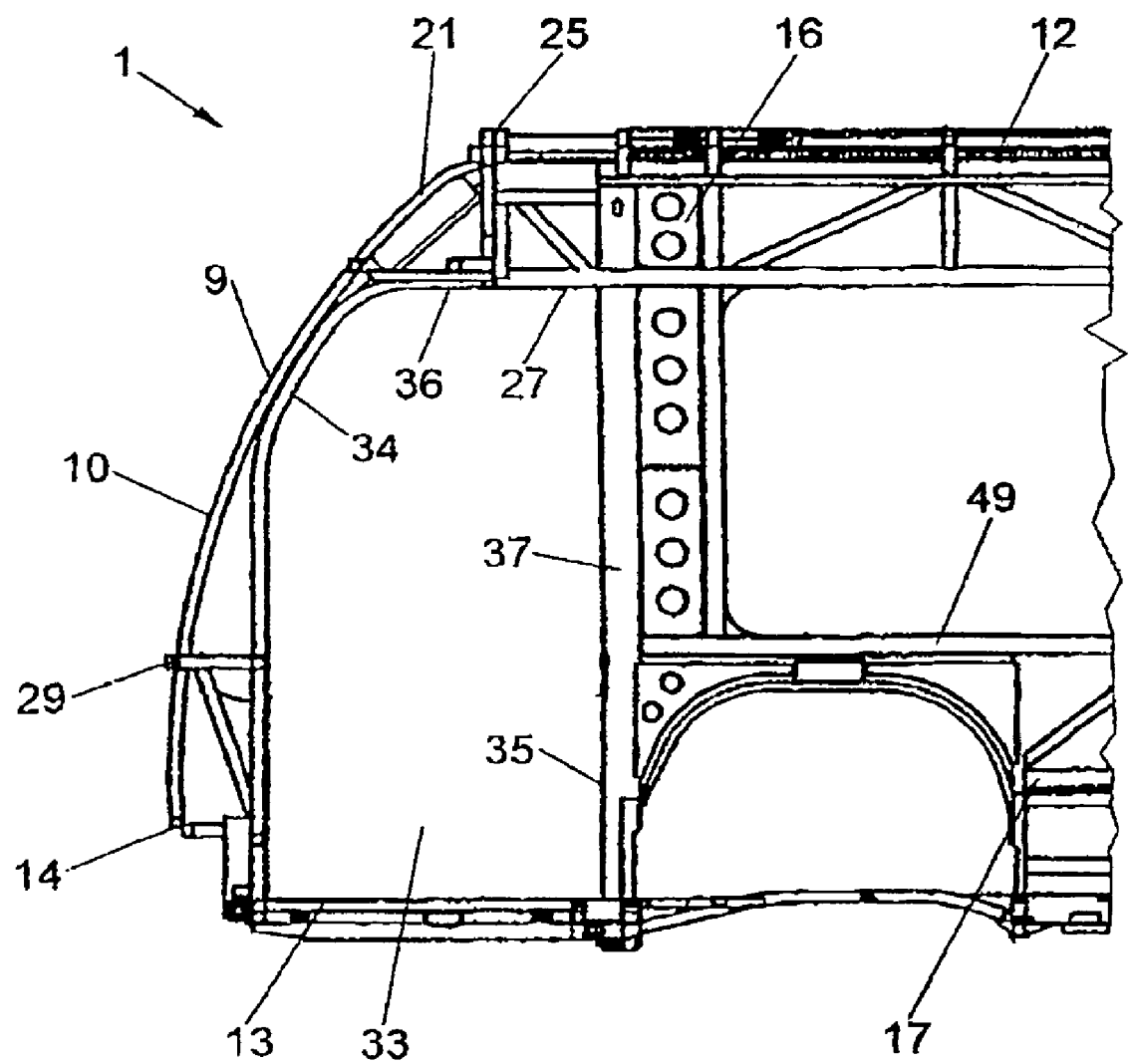
FIG. 4 is a right side view of the framework according to FIG. 2.

The example according to FIGS. 1–4 relates to a rear-engined, low board bus. FIG. 1 shows a perspective view of a front part 1 of a space frame of said bus. Said space frame has a load carrying board frame 3 and two side frameworks 17, 20 having an upper balk 23, an upper crossbalk 25, an upper window balk 27, door and window pillars, and carrying a body 12.

The front part 1 comprises a one-piece windscreen 4 that takes about a half or more of the whole surface of the front wall 2 of the bus. The windscreen 4 has been fixed in a window frame 5 by an adhesive or some other nesting means 6. The window frame 5 comprises an upper member 7, an under frame member 28 and two side members 9, which side members 9 are parts of prongs 32 of a U-shape member 10. The U-shape member 10 comprises an arched section 11 reaching down about to the board frame 3, two side members 9 of the window frame 5 and, as a continuation of said side members 9, two curved upper parts 21. Said arched section 11, both side members 9 and the two upper parts 21 form the two prongs of the U-shape member 10. Preferably the U-shape member 10 is made of pieces of steel tube welded together in line.

Ends 8 of the tubelike upper member 7 of the window frame 5 are welded to the side members 9 at their upper end. Ends of the under frame member 28 of the window frame 5 are welded to the side members 9 at their under end. Said under frame member 28 is a part of a waist plate 29 which holds the instrument board and other equipment and which is a framework made of steel plate.

The middle part of said arched section 11 of the U-shape member 10 is fixed to the middle part 13 of an under crossbalk 14 of the board frame 3 of the vehicle. Horizontal curved ends 15, 18 of said crossbalk 14 are welded to the framework 17, 20 of 16, 19 sidewalls of the vehicle.

The upper parts 21 of the U-shape member are curved in order to have their ends 22 in line with the longitudinal upper balks 23 of the frameworks 17, 20 of sidewalls 16, 19 of the vehicle. The ends 22 of the upper parts 21 are each welded to an end 26 of the upper crossbalk 25 at a node 24 of the upper balk 23, upper crossbalk 25 and upper part 21 of the U-shape member. In a space between the upper member 7 of the window frame 5 and the upper crossbalk, a display for the route of the bus can be arranged.

The U-shape member 10 according the example is made of three pieces of steel tube, welded together in welding points 30 which are different from welding points 31 of the side members 9 and under frame member 28 of the waist plate 29.

The bus according to FIGS. 1–4 is a city bus for mass transportation. It has, in the immediate vicinity of the windscreen 4 in its right sidewall 16, a passenger door, and in its left sidewall 19 a driver's door. A section 34 of doorframe 35 of the passenger door opening 33 is limited by a section of the side member 9 of the window frame 5. Upper part 36 of the doorframe 35 is in line with an upper window-balk 27. One pillar 37 of the doorframe 35 is common with the first side-window opening 38. On the other side of the bus, the driver's door opening 39 is framed by an upper part of the doorframe being in line with the upper window-balk 27 of the right sidewall 19, a pillar 40 being common with the first side-window opening, and a pillar 41 being common with a three-cornered window opening 45 arranged between said pillar 41 and the side member 9 of the window frame 5. U-shape member, pillar 41 and upper member 7 are united in a welded node 43 at the upper end 42 of the pillar 41. The window opening 45 is further limited by an under frame member 44 while the driver's door opening 39 is further limited by an under frame member 49 arranged at about the same height.

Above the middle part of the U-shape member, under the under member of the window frame there is an instrument-door opening 46 for mounting the instrument board, closed by an instrument-board door 48. Under both prongs of the U-shape member there are nest openings 47 for lighting and signaling apparatuses.

Covering panels and other elements of the body are not illustrated in the drawing. These elements are made preferably of fibers reinforced hardening polymers. A nest for the windscreen 4 made of fibers reinforced hardening polymers may be tied or gummed to the metal frame.

The U-shape member can be made not only of steel tube as illustrated above, but it can be made of carbon fibers reinforced hardening polymers as well or of other steady material appropriate to secure passenger safety by a possible accident or overturn of the bus.

What is claimed is:

1. A vehicle frame for busses comprising:
a load carrying framework and a body mounted on the framework,
said framework comprising a board frame, a window frame for a windscreen, a pair of upper balks and a pair of upper window balks along both sides of the vehicle and supported at least by door pillars, and
wherein said window frame comprises a one piece U shaped member arranged between the board frame and the pair of upper balks, and an upper cross member connected to prongs of the U-shape member, with
the under part of said U-shape member being fastened to the board frame and an intermediate part of both prongs of the U-shape member being fastened to a waist plate fixed on the board frame.

2. A vehicle frame according to claim 1 wherein the U-shape member is assembled by welding together pieces of metal pipe,
the upper ends of the U-shape member are curved to be in line with the upper balks,
and said ends of the U-shape member are welded to the upper balks.

3. A vehicle frame according to claim 2 wherein a doorframe of a passenger door is arranged in the vicinity of and in line with a section of a prong of the U-shape member, with the upper part of said doorframe being in line with an upper window balk of the framework of a sidewall.

4. A vehicle frame according to claim 2 wherein a doorframe of a driver's door is arranged in the vicinity of a section of a prong of the U-shape member, with the upper part of said doorframe being in line with an upper window balk of the framework of a sidewall, and there is a window opening between said doorframe and the U-shape member bordered by an under frame member.

* * * * *